(12) United States Patent
Hvidberg

(10) Patent No.: US 7,157,817 B2
(45) Date of Patent: Jan. 2, 2007

(54) DRUM DRIVE WITH DAMPING DEVICE FOR DAMPING VIBRATIONS

(75) Inventor: Jens Hvidberg, Hvidovre (DK)

(73) Assignee: Interroll (Schweiz) AG (CH)

( * ) Notice: Subject to any disclaimer, the term of this patent is extended or adjusted under 35 U.S.C. 154(b) by 0 days.

(21) Appl. No.: 10/533,513

(22) PCT Filed: Nov. 13, 2003

(86) PCT No.: PCT/EP03/12704

§ 371 (c)(1),
(2), (4) Date: May 2, 2005

(87) PCT Pub. No.: WO2004/045995

PCT Pub. Date: Jun. 3, 2004

(65) Prior Publication Data

US 2006/0049702 A1    Mar. 9, 2006

(30) Foreign Application Priority Data

Nov. 15, 2002 (DK) ............................. 2002 01761

(51) Int. Cl.
*H02K 5/24* (2006.01)
(52) U.S. Cl. .......................................... 310/51; 310/90
(58) Field of Classification Search .................. 310/51, 310/89–91, 254, 261
See application file for complete search history.

(56) References Cited

U.S. PATENT DOCUMENTS

| | | | |
|---|---|---|---|
| 3,361,914 A * | 1/1968 | Janssen ........................ 310/51 |
| 4,076,197 A | 2/1978 | Dochterman | |
| 4,617,484 A * | 10/1986 | Buijsen ........................ 310/51 |
| 4,783,608 A * | 11/1988 | Gruber et al. ................ 310/90 |
| 5,798,887 A | 8/1998 | Yoshida et al. | |
| 5,969,446 A * | 10/1999 | Eisenhaure et al. .......... 310/74 |
| 6,239,730 B1 | 5/2001 | Wenger | |
| 6,329,730 B1 * | 12/2001 | Neckermann et al. ........ 310/51 |
| 6,402,653 B1 | 6/2002 | Jensen | |
| 6,507,135 B1 * | 1/2003 | Winkler ........................ 310/91 |

FOREIGN PATENT DOCUMENTS

| | | |
|---|---|---|
| DE | 24 01 308 A1 | 7/1975 |
| DE | 43 24 912 A1 | 1/1995 |
| DK | 96 00125 U4 | 7/1997 |
| EP | 0 942 192 A1 | 9/1999 |
| EP | 1 375 872 A1 | 1/2004 |
| SE | 7511303 | 4/1977 |

* cited by examiner

*Primary Examiner*—Thanh Lam
(74) *Attorney, Agent, or Firm*—Gerald E. Hespos; Anthony J. Casella

(57) ABSTRACT

The invention relates to a drum drive that delimits an interior space intended for receiving an electromotor for producing a rotating movement of the drum. The electromotor comprises a stator, shell and stator cap. The stator is turnably journalled about the shaft (7), wherein the drive comprises at least one damping device (10) connected to the shaft (7) and to the stator, and extending radially from the shaft in a plane that is essentially at right angles thereto; and wherein the damping device (10) is configured for absorbing forces that strive to rotate the stator about the shaft.

14 Claims, 3 Drawing Sheets

DRUM DRIVE WITH DAMPING DEVICE FOR DAMPING VIBRATIONS

Figure 1:
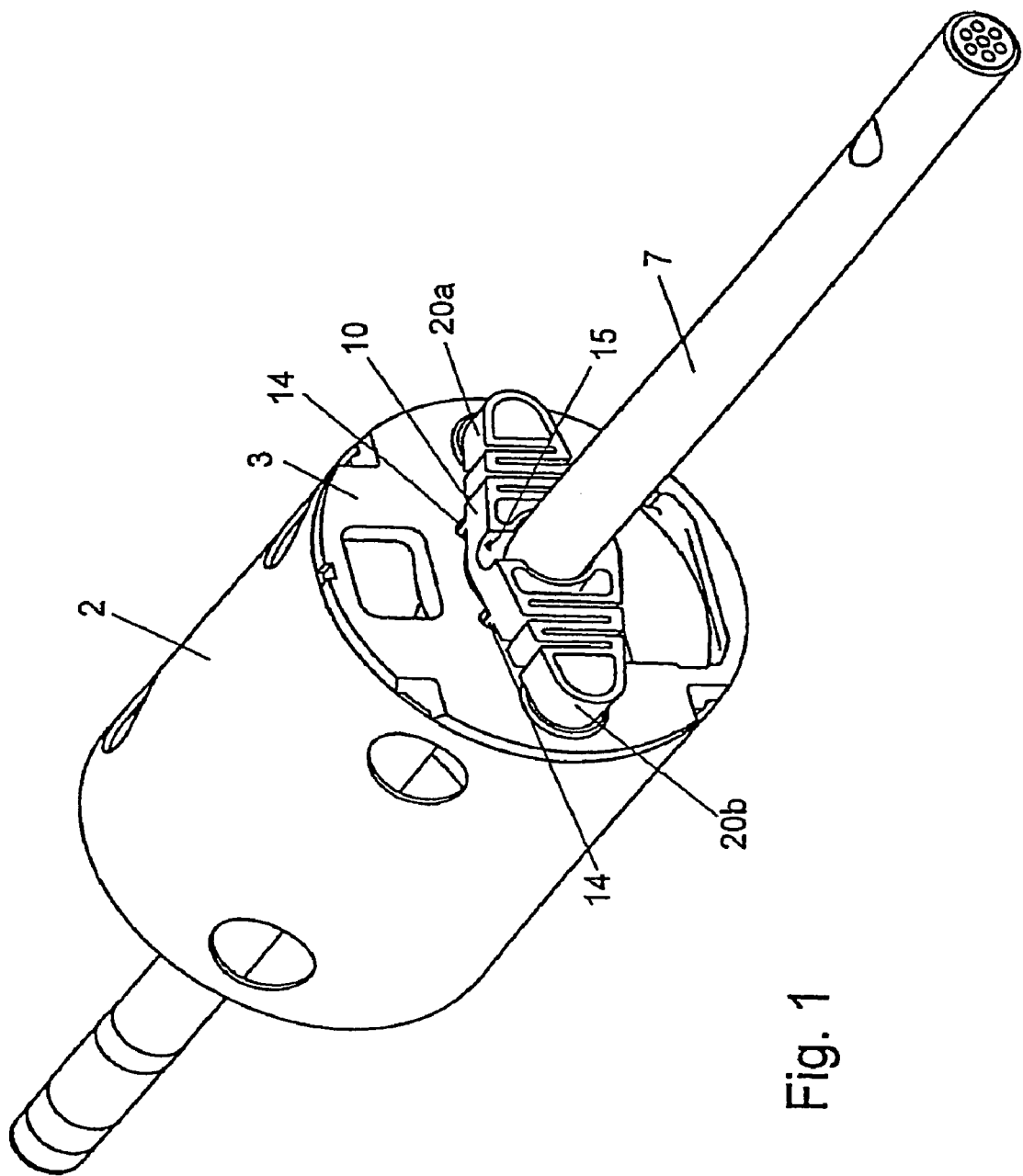

The present invention relates to a damping device for damping vibrations from a drum drive.

In installations where conveyor belts are used and where a compact and space-saving exterior are demanded, drum drives of the type described below are widely used. It may be eg point-of-sales terminals in supermarkets, where drum drives drive the conveyor belt for transporting goods to a point-of-sales operator for registration, and in other conveyor belts for transportation of goods away from the point-of-sales operator. In operation, drum drives of the prior art type causes low-frequency vibrations in the area around the frequency of the supply voltage, and these vibrations transplant from the electromotor via the shaft into the supporting element where they bring about noise pollution. The vibrations vary with the load on the electromotor, and it will be understood that a loaded conveyor belt in operation will emit more noise than an unloaded conveyor belt, whereby the use of drum drives for conveyor belts in connection with point-of-sales terminals will cause the point-of-sales operator who operates such terminal to experience relatively much noise pollution. Therefore, the procedure was previously to mount the shaft of the drum drive in a damping suspension device on the supporting element. That solution is disadvantageous as it is rather time-consuming to mount the drum drive on the supporting element and, likewise, more mounting space is required.

The present invention aims to solve the problems that have so far been associated with the use of drum drives in connection with conveyor belts for eg point-of-sales terminals, where the space for mounting on the supporting element is limited and where the demands to a drum drive mounted with a low level of noise and vibrations are high. This is achieved as featured in the characterising part of claim 1, advantageous embodiments being featured in the dependent patent claims.

A conventional drum drive is taught in Danish utility model registration No. 96 00125. Usually such drum drive comprises an essentially cylindrical drum of eg iron or stainless steel and having end caps and delimiting an internal space intended for receiving an electromotor for producing a rotating movement of the drum. The electromotor comprises a stator, a shell and a stator cap. Through the end caps a fixed shaft extends that is confined for being mounted on a supporting element. Drum drives of the described type conventionally lend themselves for use in connection with transport plants with a conveyor belt of a rubber material that abuts directly on the cylindrical drum and is advanced by friction when the drum rotates in relation to the fixed shaft.

The damping device according to the invention is intended for being mounted on the fixed shaft and for forming a flexible connection between the fixed shaft and the stator or stator cap of the electromotor. The damping device can preferably be formed with a centre element intended being secured against rotation on the fixed shaft, from which a spring element integral with the centre element extends. Apart from that, the spring element has connecting means for connecting the damping device to the stator or the stator cap. The stator and the shell are connected to each other and are turnably journalled on the shaft. Interiorly of the shell the rotor part of the electromotor is provided and the rotor influences the stator with a reaction force. It is the object of the invention to dampen the reaction forces produced in the shaft due to variations in this reaction force during operation of the electromotor. The spring element acts as a flexible connection and serves to absorb vibrations from the electromotor and prevents the latter from transplanting via the fixed shaft into the supporting element.

With the damping device according to the invention it is also obtained that the spring element for a given power impact on the connecting means will flex in response to a thrust impulse and absorb the impacts produced by eg the starting momentum of the drum drive during starting up.

Figure 2A:
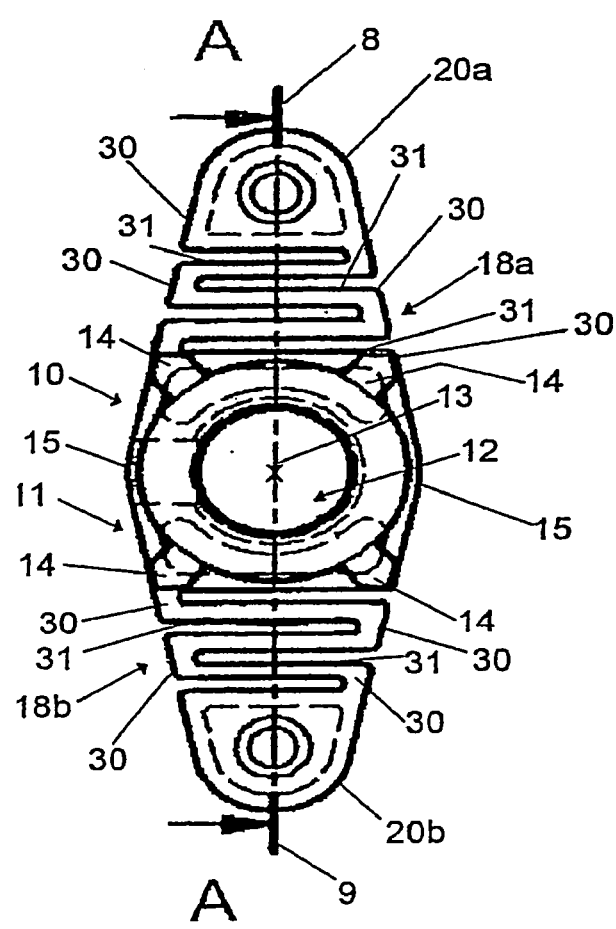
Figure 2B:
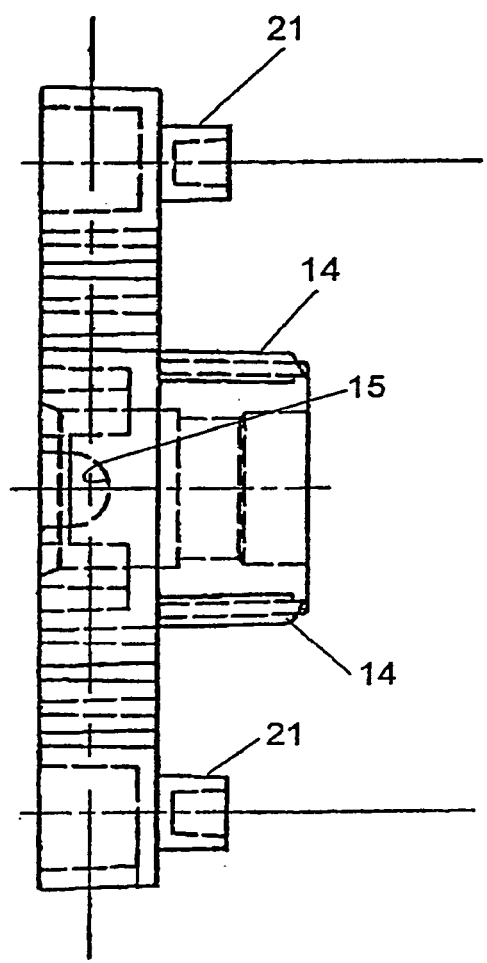
Figure 3:
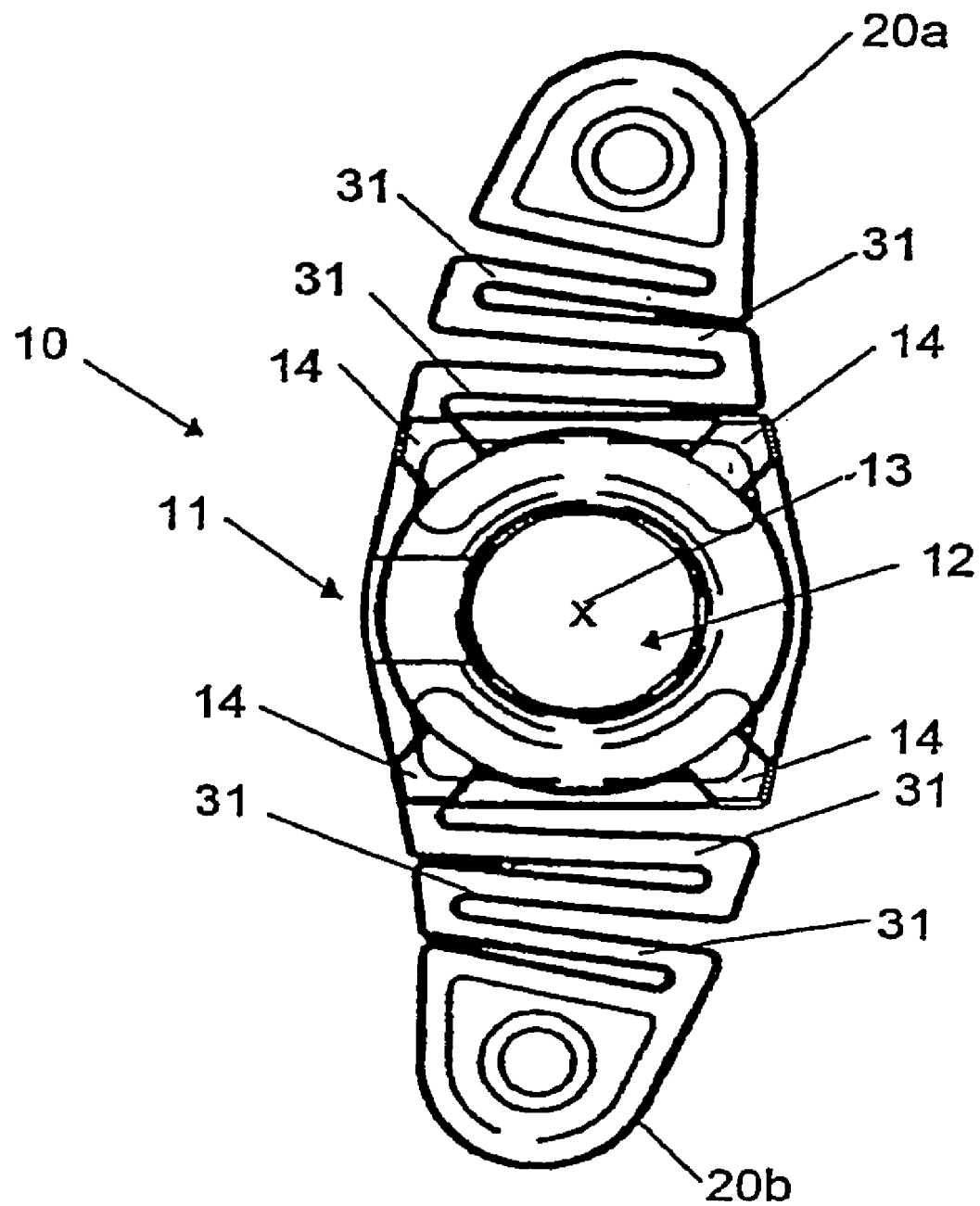

The invention will now be described in further detail with reference to the drawing, wherein FIG. 1 shows a preferred embodiment of the invention in a sectional view of a prior art drum drive with damping device; and FIG. 2*a* shows in the plane an embodiment of the damping device; and FIG. 2*b* is a sectional view through the embodiment shown in FIG. 2*a*; and FIG. 3 shows the embodiment shown in FIG. 2 of the damping device, wherein the spring elements are compressed in an extreme position in response to a force applied at the connecting means.

FIG. 1 is a sectional view of a drum drive with shell (2), a stator cap (3), a fixed shaft (7), and a damping device (10) and illustrates how the damper device (10) is mounted for transfer of momentum between the shaft (7) and the stator cap (3) of the electromotor. The damping device (10) is mounted on the shaft (7) with securing means (not shown) that engage in a recess (15) in a centre element (11) and are secured to the stator cap (3) via connecting means (21, not shown) and via coupling means are introduced into recesses intended therefor in the stator cap (3) for transfer of turning momentum between the stator cap (3) and the shaft (7) and further into a supporting frame.

Exteriorly around the shell shown in FIG. 1, there is in a conventional manner mounted a not shown cylindrical drum, whereby the drum drive appears with the configuration taught in Danish utility model No. 96 00125.

The stator cap (3) and the shell (2) are connected to each other and are turnably journalled on the shaft (7). Interiorly in the shell (2) the rotor part (not shown) of the electromotor is provided, and the rotor influences the stator with a reaction force. During operation of the electromotor the reaction force on the stator/the shell (2) must be transferred to the shaft (7).

The following description refers to FIGS. 2*a* and 2*b* that are more detailed views of a preferred embodiment of an integrally moulded damping device (10) of a plastics or rubber material, comprising a centre element (11) having a central circular opening (12) with centre (13), configured for enclosing a shaft (not shown) of the type used in a drum drive (not shown). Extending from centre (13) of the central opening (12) a first longitudinal axis (8) extends in the plane and a second longitudinal axis (9) under an angle of 180°. Coinciding with the central circular opening (12) the damping device features a recess (15) that will, in connection with an opening in the not shown shaft (7) and a tap-shaped securing means (not shown), ensure transfer of a turning momentum between the damping device (10) and the shaft and further out into a supporting frame (not shown).

The centre element (11) is connected to a first connecting element (20*a*) by means of a spring element (18*a*) comprising segments (31) that extend essentially at right angles to the first axis (8) that protrudes from a first transition part (30) in the plane from one side of the centre element (11) at right angles to the first axis (8). From an opposite side, the centre element (11) is connected to a second connecting element (20b) via a spring element (18b), comprising segments (31) that protrude essentially at right angles to a second axis (9) and with an expanse in the plane, and extending from a second transition part (30). The segments (31) are connected to each other and to the connecting element (20a, 20b) via transition parts (30), such that said segments (31) and the transition parts (30) combine to form a zigzag shape.

The connecting element (20a, 20b) is formed essentially symmetrically about the axis (8, 9) and comprises connecting means (21) having an expanse at right angles to the plane, by means of which the connecting element (20a, 20b) is connected to the stator cap of the motor.

FIG. 3 shows the damping device (10) shown in FIG. 2 and illustrates how the segments (31) in the spring elements (18a, 18b) can flex by an impact applied to the connecting means (21) in the direction of rotation during operation of the motor, where the rotor influences the stator by a rotational force.

In the figure the spring elements (18a, 18b) are flexed within material tolerances, whereby the individual segments (31) touch/are in contact with a part of a surface of super- or subjacent parts (segments (31)), the connecting element (20a, 20b) and centre element (11)), respectively, in the flexing direction opposite the side onto which an impact is applied.

The spring elements (18a, 18b) are intended for absorbing the impact on the connecting elements (20a, 20b) and, for the given impact, they will flex against the direction of rotation of the rotor and will, in particular when the drum drive starts up, they will reduce the impact impulse provoked by the starting momentum during starting up.

It will be understood, that the damping device (10) will, when an impact on the connecting means (20a, 20b) ceases, in the direction of rotation of the rotor, assume the shape shown in FIG. 2, the segments (31) being made of an elastic material, and that operation is carried out within the elastic, non-permanent tolerance area of the material in question.

It will also be understood that the spring elements (18a, 18b) will advantageously be configured such that rigidity is provided in the individual segments (31) that decrease with the distance from the centre (13) of the circular opening (12) towards the connecting elements (20a, 20b) and that thereby an even flexing of the spring element (18a, 18b) is provided. Thereby a comparatively even distribution of force is also obtained across the spring elements (18a, 18b) and a more uniform load on the material. This variation in the rigidity may be provided for example by a change the material thickness. Likewise, it will be possible to provide the difference in rigidity and thus the flexing of the individual spring elements (18a, 18b) by configuring them with an expanse essentially at right angles to the axis (8,9) that will, for the individual segment (31), decrease towards the connecting elements (20a, 20b).

In some situations, the damping element (11) will, when the drum drive starts up, be loaded with a powerful starting momentum that can be as much as 6–8 times the momentum load during operation. This starting momentum may give rise to a particularly powerful load on parts of the damping element and in particular the spring elements (18a, 18b) that may cause the segments (31) to be loaded in excess of their material tolerances, thereby causing them to rupture. In order to avoid such material ruptures the centre elements (11) may advantageously be formed with coupling means (14) extending at right angles to the plane symmetrically about the central circular opening (12) and in the same direction as the connecting elements (21). These coupling elements (14) are destined for engaging with a recess in the stator cap of the electromotor and will, when the damping device (10) is turned about the centre (13) in the area +/− (plus/minus) 2–10° and preferably +/−(plus/minus) 5° from an unloaded starting position abut on an edge intended therefor in the recess on the stator cap (3) of the electromotor or on another recess with the same function on the stator. Thereby it is ensured that the starting momentum of the electromotor will for a first part be absorbed by the spring elements (18a, 18b) that will flex in response to the load within allowable material tolerances. Thereby it will be understood that for elevated values of the starting momentum and thus flexings of segments (31) within the allowable material tolerances, a modest further flexing of the segments (31) will take place before the coupling elements (14) will engage with the face in the recess intended therefor and cause the starting momentum to be absorbed in the coupling elements (14) that will thus relieve the spring elements (31) and counteract an unintentional load and optionally material ruptures. In this situation the spring elements dampen the impact from the starting momentum and hence the load on the material. Advantageously the spring elements could be formed of plastics material, rubber material or metal.

In FIG. 2 the damping device is shown with the spring elements extending from transition parts (30) to the left of the axis (8, 9). Thereby it is obtained that the damping device (10) will have a vibration-damping effect that is independent of the current direction of the rotation of the electromotor. It will thus also be understood that, provided a vibration-damping effect is desired that depends on the axis of rotation of the electromotor, the damping device (10) will be formed with spring elements (11) extending across transition parts to the left around the one axis (8) and other spring elements (11) extending to the right around the second axis (9).

The invention claimed is:

1. A drum drive comprising an essentially cylindrical drum that delimits an internal space intended for receiving an electromotor for producing a rotating movement of the drum about a fixed shaft (7) intended for being fixedly mounted on supporting elements, characterised in that the drum drive includes a stator cap (3) that is fixed to the cylindrical drum and turnably journalled about the fixed shaft (7); that the motor comprises at least one resilient damping device (10) that is connected to the fixed shaft (7) and to the stator cap (3) and extends radially from the fixed shaft (7) in a plane essentially at right angles thereto; and that the damping device (10) is intended for absorbing forces that strive to cause the stator cap (3) to rotate about the fixed shaft (7).

2. A drum drive according to claim 1, characterised in that the damping device comprises a centre element (11) configured for being fixedly connected to the fixed shaft (7); at least a first connecting element (20a) configured for being connected to the stator cap (3); and at least a first spring element (31) that exhibits a plane zigzag-shaped course in relation to a first straight line (8) from the centre element (11) to the first connecting element (20a).

3. A drum drive according to claim 2, characterised in that the damping device further comprises at least a second spring element (31) with a plane zigzag-shaped course in relation to a second straight line (9); a second connecting element (20b) configured for being connected to the stator cap (3); and a second spring element (31) connecting the centre element (11) to the second connecting element (20b) and extending in the same plane as the first straight line (8) under an angle in relation thereto.

4. A drum drive according to claim 3, characterised in that the spring elements (31) are arranged rotationally symmetrical about the centre element (11).

5. A drum drive according to claim 3, characterised in that the spring elements (31) comprise segments (31) that extend substantially at right angles to said straight lines (8,9) between the centre element (11) and the connecting elements (20a, 20b).

6. A drum drive according to claim 5, characterised in that the segments (31) are connected to each other via transition parts (30) that extend approximately in parallel with said straight lines (8, 9).

7. A drum drive according to claim 5, characterised in that lengths of the individual segments (31) decrease towards the connecting elements (20a, 20b).

8. A drum drive according to claim 5, characterised in that the individual segments (31) have widths that decrease towards the connecting element (20a, 20b).

9. A drum drive according to claim 2, characterised in that the spring element (31) is formed of plastics material.

10. A drum drive according to claim 2, characterised in that the spring element (31) is formed of metal or of a rubber material.

11. A drum driving device according to claim 2, characterised in that the spring element (31) comprises segments (31) that extend substantially at right angles to said straight line (8) between the center element (11) and the connecting element (20a).

12. A drum drive according to claim 11, characterised in that the segments (31) are connected to each other via transition parts (30) that extend approximately in parallel with said straight line (8).

13. A drum drive according claim 11, characterised in that lengths of the individual segments (31) decrease towards the connecting element (20a).

14. A drum drive according to claim 11, characterised in that the individual segments (31) have widths that decrease towards the connecting element (20a).

* * * * *

UNITED STATES PATENT AND TRADEMARK OFFICE
CERTIFICATE OF CORRECTION

PATENT NO. : 7,157,817 B2 Page 1 of 1
APPLICATION NO. : 10/533513
DATED : January 2, 2007
INVENTOR(S) : Jens Hvidberg It is certified that error appears in the above-identified patent and that said Letters Patent is hereby corrected as shown below:

On the title page (73), delete "Interroll (Schweiz) AG" and replace with --Interroll Holding AG--.

Signed and Sealed this

Third Day of April, 2007

JON W. DUDAS
*Director of the United States Patent and Trademark Office*